March 9, 1971  G. FONDA-BONARDI  3,568,443
STARTING APPARATUS FOR A FLUID-DYNAMIC ENGINE
Filed Aug. 14, 1969  2 Sheets-Sheet 1

INVENTOR.
GIUSTO FONDA-BONARDI
BY
Christie, Parker & Hale
ATTORNEYS

United States Patent Office 3,568,443
Patented Mar. 9, 1971

3,568,443
STARTING APPARATUS FOR A FLUID-
DYNAMIC ENGINE
Giusto Fonda-Bonardi, Los Angeles, Calif., assignor to
 Robert S. Estes, Los Angeles, Edward S. Merrill, Palm
 Springs, Jay Kurtz, James Linahan, and Carl Clement,
 Los Angeles, and Royal M. Galvin, Pacific Palisades,
 Calif., a fractional part interest to each
Filed Aug. 14, 1969, Ser. No. 849,973
Int. Cl. F01k 3/18
U.S. Cl. 60—59    10 Claims

ABSTRACT OF THE DISCLOSURE

This invention relates to a fluid-dynamic engine wherein a gas is accelerated through the engine at the speed of sound at the sonic speed of the gas and imparting energy to the gas while maintaining it at the sonic speed. The engine may comprise a duct having a sonic duct section interposed between convergent and divergent sections so that it is successively accelerated to the sonic speed through the convergent section and moves through the sonic section at the sonic speed. The engine includes starting means for momentarily imparting a velocity equal to the speed of sound when the gas is quiescent to accelerate it to sonic speed. The starting means may also comprise means for isolating a portion of the generating fluid path while the gas is quiescent and evacuating the isolated path so that the fluid outside the isolated path may be accelerated to sonic speed and then passing it through the isolated path to start the engine.

---

This invention relates to a device for starting a gas-dynamic engine of the type disclosed in my copending patent application Ser. No. 798,367.

The aforementioned copending application states in part: "The gas encounters first a convergent section where it is accelerated to Mach 1 by an (adiabatic) expansion. The gas then enters a gently diverging duct section wherein heat is delivered to the gas . . . (the sonic) duct is followed by a (subsonic) diffuser where part of the kinetic energy of the gas is recovered in the form of increased pressure, so that the pressure at the exit of the diffuser is equal to the pressure at the inlet of the converging section. . . ." An exhaust pressure equal to the inlet pressure is the necessary condition for steady-state, self-sustaining operation of the engine, since it permits the thermodynamic cycle to be closed by means of a constant-pressure transformation either in the atmosphere or within a pressure-tight envelope (as disclosed in application Ser. No. 836,046). In either case the gas, once set in motion, keeps circulating indefinitely as long as the increment of kinetic energy resulting from heating at Mach 1 equals or exceeds the sum total of losses of kinetic energy encountered along the circuit, including frictional losses and the purposeful extraction of kinetic energy in the form of useful power output. In this sense, the recovery of pressure in the subsonic diffuser can be construed as the "suitable contrivance (not shown)" required to deliver the gas to the convergent section discussed in application Ser. No. 798,367, and is operative as long as the total losses of kinetic energy (or of stagnation pressure) do not exceed the gain in the cycle. However, an engine capable of steady-state continuous operation is not necessarily capable of starting itself from a quiescent condition.

Accordingly, the purpose of this invention is to provide a device capable of setting in motion the operating fluid of an engine of this type, and in particular of momentarily establishing in the duct a flow with the speed of sound, which then is maintained indefinitely by virtue of the increase of kinetic energy experienced by the fluid if simultaneously heated.

This and further advantages of the invention can be realized through the reference to the drawings forming part of this specification wherein.

Figure 1:
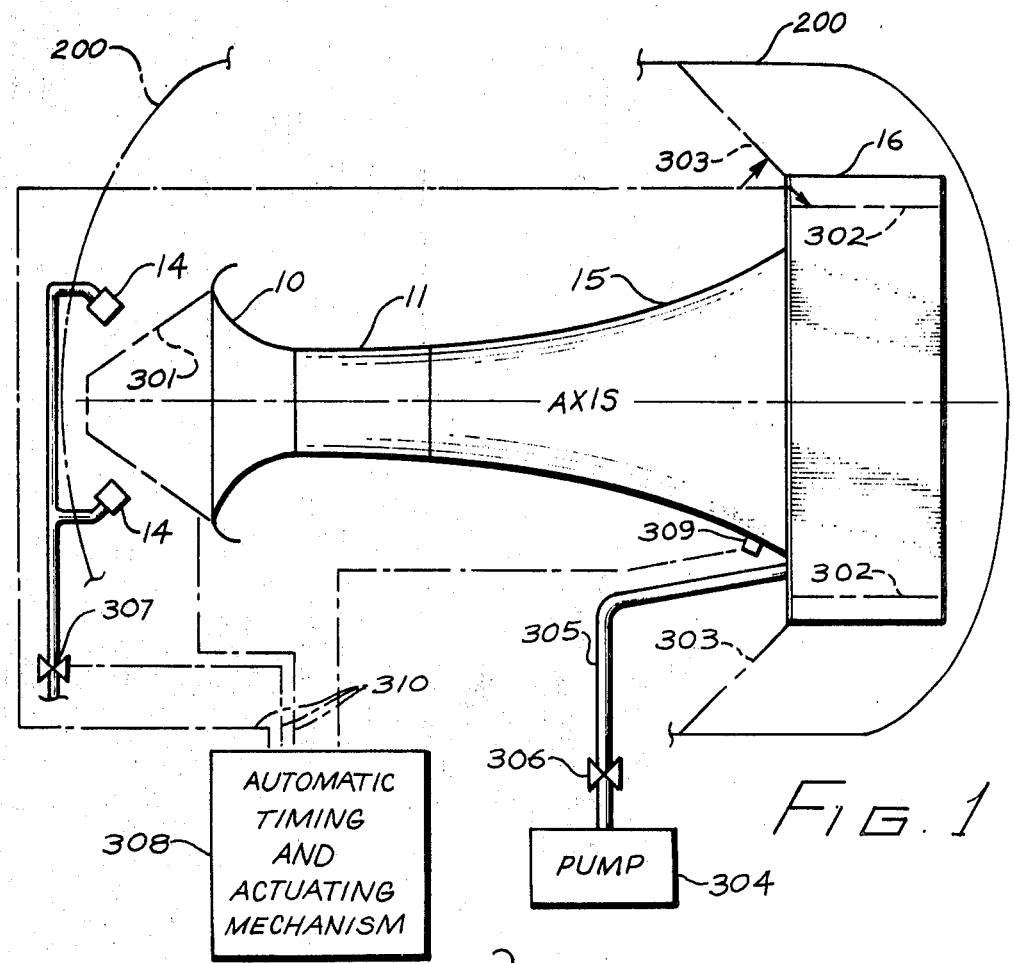
FIG. 1 is a schematic illustration of the fluid dynamic engine embodying the invention.

Now referring to FIG. 1, the operation of the starting device will be examined. The operation of the starting device of the present invention depends on the activation of two removable pressure-tight barriers which can be used to isolate a portion of the duct from the remainder of the system, the first barrier being upstream of the sonic section and the second downstream, so that the isolated portion of duct comprises the sonic section and, in addition, as much of the remainder of the system as is convenient for a practical implementation.

It will be recalled from the teachings of my copending application bearing Ser. No. 798,367, and which teachings are incorporated herein by reference, that the operating fluid or gas is operated on in a duct constructed and defined for accelerating and maintaining the operating fluid at sonic speeds. The gas encounters first a convergent section 10 where it is accelerated to Mach 1 by an (adiabatic) expansion. The gas then enters a gently diverging duct section 11 wherein heat is delivered to the gas by a suitable source, for example a flame 12 created by burning fuel droplets 13 injected somewhere upstream by a spray nozzle 14.

Duct 11 is followed by a diffuser 15 where part of the kinetic energy of the gas is recovered in the form of increased pressure, so that the pressure at the exit of diffuser 15 is made equal to the pressure at the inlet of the converging section 10. The remainder of the kinetic energy, still possessed by the gas after recompression, is applied to a conventional utilizing means 16. The purpose of diffuser 15 is to undo the change of pressure introduced by the convergent section 10 in order to accelerate the gas to Mach 1. The convergent section 10 and diffuser 15 in combination are used simply to cause the gas to move at the desired speed in sonic section 11 without otherwise affecting, in the ideal case, the conditions at the inlet and at the outlet of the device.

The preferred location for the first barrier is symbolized by dotted line 301 in or near the convergent inlet section 10, which is modified to accommodate the presence and action of the first barrier without otherwise impairing the duct's function of accelerating the working fluid to the speed of sound by an (adiabatic) expansion from an initial pressure $p_1$ to the critical pressure $p^*$.

The second barrier is preferably located at the exhaust end of the subsonic diffuser 15, as symbolized by dotted line 302, or downstream of utilization means 16, as symbolized by dotted line 303. Both said first and second barriers are organized to be removable in a very short time, i.e., to be capable of passing from a fully closed configuration in which they are substantially impervious to the fluid, to a fully open condition in which they do not appreciably impede the fluid flow at normal operating speed, in a total actuating time of the order of a few milliseconds. The actuating mechanism is designed to insure opening the barriers in said very short time, whereas the opposite transition from open to fully closed may take an arbitrarily longer time.

A pump 304 is connected to the isolated segment of duct between the two barriers (which map or may not comprise also utilization means 16), by means of a tube 305. If the engine is arranged for closed cycle operation in accordance with reference aapplication No. 836,046 (represented by the envelope 200), pump 304 may be physically distinct from pump 220 used in said application Ser. No. 836,046 to vary the internal pressure of the closed-cycle engine, or may be the same pump equipped with an additional valve 306. When both barriers are closed, pump 304 is used to evacuate the isolated segment of duct between them to a pressure equal to or lower than the normal critical operating pressure $p^*$. The fluid removed from the duct is returned either to the atmosphere in the case of an open-cycle engine, or to the interior of pressure envelope 200 in the case of the closed-cycle engine. When the desired pressure difference is established across the barriers, suitable mechanisms, to be discussed below, cause the following events to take place in sequence:

First, a potential source of heat for the working fluid is created in the region facing the first barrier, by charging the (stagnant) fluid located there with a fine mist of liquid droplets sprayed by nozzles 14 as disclosed in application Ser. No. 798,367. This is done by opening (manually or automatically) a valve 307 on the tube that feeds nozzles 14.

Second, said first barrier in location 301 is caused to be opened in a very short time, a short time being defined as appreciably shorter than the time required for filling the evacuated volume comprised between the two barriers to a pressure high enough as to slow down the flow thus established. If the pressure in this volume is initially lower than $p^*$, the flow has initially the speed of sound in sonic section 11, as discussed in application No. 798,367. This condition remains as long as the pressure downstream of sonic section 11 remains lower than or equal to $p^*$. If the pressure is initially lower, the flow becomes temporarily supersonic in the divergent duct 15. The supersonic flow is terminated by a normal shock which is initially located far downstream. As more fluid is admitted into the volume behind the shock, the pressure there increases and the shock moves gradually upstream until it finally reaches sonic section 11. When this happens the flow begins to slow down and to depart from the condition $M=1$; but until then the flow in sonic section 11 enjoys steady-state sonic operation for a length of time directly proportional to the volume initially evacuated and inversely proportional to the rate of mass flow into it.

Third, the liquid droplets entrained in the gas flow deliver their heat content to the gas while it is moving at the speed of sound in sonic section 11, thereby increasing its stagnation pressure. This means that the pressure $p_2$ downstream of the diffuser, behind the shock where the gas stagnates, can become equal to or higher than the intake pressure $p_1$, a condition similar to that found in the normally operating engine.

Fourth, when the pressure $p_2$ in the volume comprised between the moving shock and the second barrier approaches the pressure on the other side of the second barrier (which is equal to the inlet pressure $p_1$) the second barrier is opened and the steady-state permanent flow is established and the engine has now been started.

The time available for performing these operations can be increased by increasing the volume of the initially evacuated portion of duct between the two barriers, and this is the reason for including the volume occupied by the utilization means 16, by locating the second barrier in position 303.

It is obvious from the foregoing that the timing of the actuation of the two barriers is of crucial importance. For this reason it is desirable to rely on an automatic timing and actuating mechanism 308 which opens the liquid flow to nozzles 14, then triggers the opening of the first barrier, subsequently triggers the opening of the second barrier in the correct sequence and with the appropriate time intervals, the first and second actions being enabled by a pressure sensor 309 which first verifies that the pressure in the evacuated duct is lower than $p^*$ by a predetermined amount before giving consent to the actuation of valve 307 and barrier in position 301, and then triggers the actuation of the barrier in position 302 or 303 when the pressure in the duct attains a value predeterminately close to the external pressure $p_1$. The inputs to and the outputs from control mechanism 308 are symbolized by dashed lines 310.

The only requirement placed on the two removable barriers is that they pass from fully closed to fully open responsively upon an actuating trigger singal in a time of the order of a few milliseconds. Many designs are possible that will do this: two are described below as examples, with the understanding that any other mechanism capable of the required performance falls within the scope of this invention.

Figure 2:
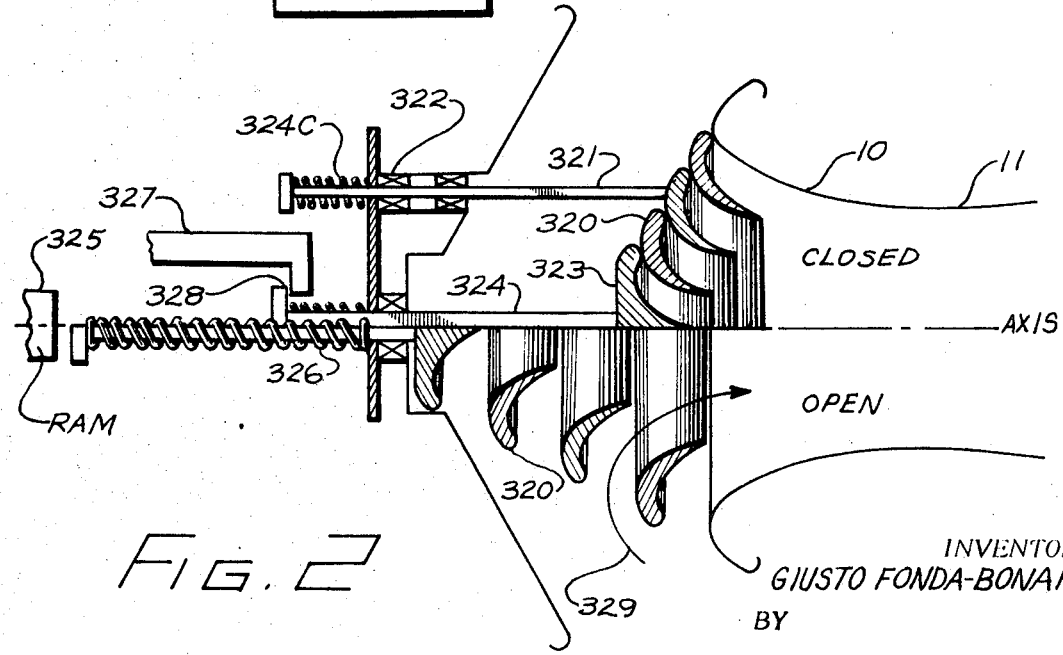
FIG. 2 is an illustration of the construction of one of the barriers of FIG. 1.

An example of a design for the first barrier is illustrated in cross-section in FIG. 2. It consists of a set of metal rings 320 concentric with each other and concentric with the axis of convergent duct 10. Each ring is supported by a set of at least three rods 321 (of which one is shown), parallel to the axis and engaged in anti-friction linear bushings 322, so that each ring can be axially translated between two predetermined positions. The diameters of the rings are graded so that each partially overlaps the preceding one and is partially overlapped by the following one. When the rings are at one extreme of their axial travel they are in contact with each other and, because of the partial overlap, they constitute a solid stack which is closed in the center by a plug element 323 also supported by a rod 324, as shown by the upper half of FIG. 2. When the rings 320 and the center plug 323 are in the other extreme of their axial travel they are equally spaced with wide gaps between them, as shown in the lower half of FIG. 2.

Two agencies insure a very rapid transfer of the rings and plug from the closed position to the open position. One is a set of coil springs 324C which are compressed when the rings are in the closed position. The other is the aerodynamic forces acting in the rings when the stack is first cracked and the fluid flow begins to be established. For this purpose the shape of each ring is generated by the rotation of a heavily cambered airfoil profile around the axis of symmetry. The lift generated by the flow around the airfoil profile cooperates with the elastic force of the compressed springs in accelerating the rings away from the closed position. If the rings are built of a rigid material of low density (e.g. titanium) the acceleration due to the aerodynamic forces can easily exceed 100 g. and an extremely rapid movement results, necessitating the use of energy-absorbing snubbers at the end of the travel to stop the rings 320 and the center plug 323 in the desired open position.

The barrier is first closed by the action of ram 325 which pushes center plug 323 away from the extreme open position towards the closed position, compressing coil spring 326. When plug 323 contacts the first ring it transmits the motion to it, and so on in sequence until all rings 320 are stacked in contact with each other and all springs 324C are compressed, the last ring being in contact with the wall of convergent duct 10. Pump 304 is then started, and when the vacuum in the duct is sufficient to overcome the force of springs 324C and 326, so that the stack can remain closed by the action of the difference between the external pressure $P_1$ and the internal, lower pressure, ram 325 is withdrawn.

When the engine is to be started, upon a signal from control mechanism 308 actuator 327 engages pawl 328 at the end of rod 324 and starts to pull plug 323 out. As soon as contact with the first ring is broken, the vacuum is relieved in the immediate neighborhood of the inner surface of plug 323, and the aerodynamic forces of the flow on this surface, added to the elastic force of spring 326, snap the plug out to the fully open position. Simultaneously, the Bernoulli force of the flow on the dorsal surface of the first ring now exposed, added to the elastic forces of its set of springs, starts to pull it away from the second ring, and so forth, until all rings come in the fully open position. When the rings are in the open position, the camber of the airfoil profiles is aligned with the streamlines of the fluid flow as it turns to enter convergent duct 10, and minimum interference with the flow results, as shown by arrow 329.

Figure 3:
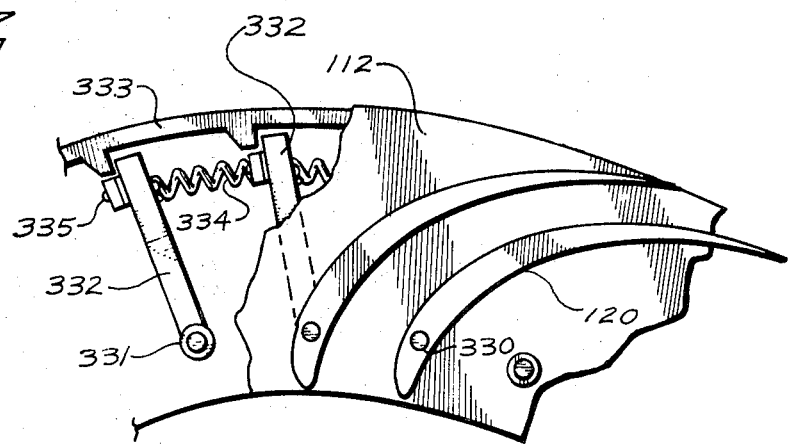
FIG. 3 is an illustration of the construction of the other barrier illustrated in FIG. 1, in operating condition.
Figure 4:
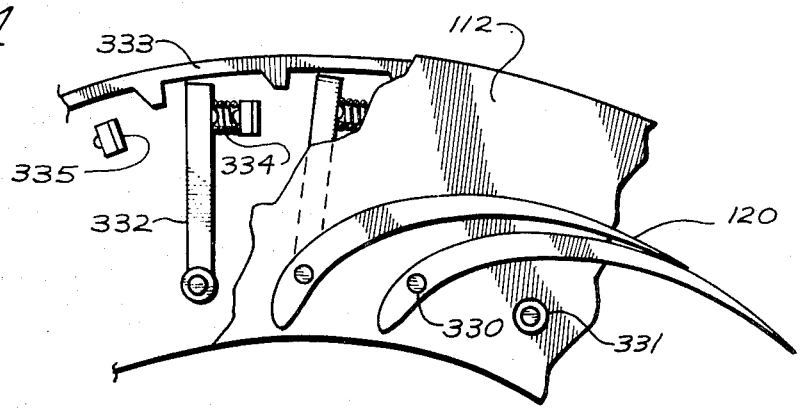
FIG. 4 is an illustration of the barrier of FIG. 3 in a non-operating condition.

The same principles are applied in the design of the second barrier if it is located in position 302. In this case, however, advantage can be taken of elements already present there, namely the turning vanes 120 discussed in application bearing Ser. No. 817,490. These vanes, instead of being rigidly mounted in a fixed position between plate 102 and flange 112 as described in the latter-mentioned copending patent application are mounted for the purposes of this invention on pivots which allow them to rotate over a limited angular range, the axis of each pivot being perpendicular to plate 102 and parallel to the axis of the engine. FIG. 3 shows two of vanes 120 in their normal (open) operating position, each vane being mounted on a pivotal shaft 330 which is supported at each end by an antifriction bearing 331 embedded respectively in a receptacle in plate 102 and one in flange 112. The shaft 330 extends through the latter bearing and protrudes in the space beyond flange 112, as shown by the cutaway portion of FIG. 3. Each shaft 330, extended through flange 112, carries a lever 332. A toothed ring 333, concentric with the ring of levers 332, engages the ends of all levers and is used to simultaneously turn all vanes to the closed position, as shown by FIG. 4, compressing coil springs 334. This operation is carried out simultaneously with the closing of the first barrier; when the vacuum in the duct is sufficient to keep the vanes closed against the force of the springs 334, toothed ring 333 is backed off (a movement which may be synchronized with the withdrawal of ram 325) leaving the vanes free to rotate back to the open position as soon as the vacuum is relieved, under the action of springs 334 augmented by the aerodynamic forces which come into play as soon as the vanes are cracked open and a flow begins to be established between them. The open position of the vanes is defined by snubber blocks 335 which limit the travel of levers 332 when the vanes approach the fully open position.

If the second barrier is in position 303 instead of 302, a design similar to that of the first barrier may be adopted (except for the absence of a center plug), namely a set of concentric, overlapping rings of airfoil-like cross-section, capable of axial motion between a fully closed position where they are in contact with each other and with the walls of the engine, and a fully open position where they have wide gaps between them. This arrangement, being an obvious elaboration of the one discussed above for the first barrier, is not illustrated.

What is claimed is:
1. A method of starting a fluid-dynamic engine from a quiescent condition, the engine utilizing a thermodynamic cycle wherein energy is imparted to the operating fluid while it is moving at the speed of sound including the steps of
   momentarily imparting a velocity equal to the speed of sound to a fluid initially at rest, and
   imparting energy to the fluid while it is moving at the speed of sound.
2. A gas-dynamic engine comprising
   means for conveying a gas at the speed of sound in said gas, the gas being initially in a quiescent condition,
   starting means for momentarily imparting a velocity equal to the speed of sound to the quiescent gas to accelerate it to sonic speed, and means for heating said gas while it is moving at said sonic speed,
   said conveying means being constructed and defined to maintain the heated gas at the sonic speed.
3. A gas dynamic engine as defined in claim 2 wherein the starting means includes means for momentarily isolating a section of the conveying means to effect the starting of the gas.
4. A method of starting a fluid-dynamic engine utilizing a thermodynamic cycle wherein energy is imparted to the operating fluid while it is moving at the speed of sound, the operating fluid moving through a duct when in operation and normally in a quiescent condition, the method including the steps of
   isolating a portion of the operating fluid path through the duct while the fluid is in a quiescent condition,
   evacuating the isolated portion to a pressure related to the fluid operating pressure,
   imparting energy to the operating fluid outside the isolated fluid path,
   momentarily admitting the operating fluid to the isolated portion of the fluid path, the time interval for admitting the operating fluid being related to the time required to fill the isolated portion of the fluid path,
   when the pressure in the isolated portion reaches a preselected pressure opening the isolated portion to effect the operation of the fluid-dynamic engine.
5. A method of starting a fluid-dynamic engine as defined in claim 4 wherein the time interval for admitting the operating fluid into the isolated fluid path is substantially less than the time required for filling the evacuated volume to a pressure high enough to decelerate the fluid flow established therein.
6. A gas-dynamic engine comprising means for conveying gas at the speed of sound in said gas, the gas being initially in a quiescent condition,
   means for isolating a portion of the gas path through said first mentioned means,
   means for evacuating the isolated portion of said first operating means,
   means for controlling the isolating means to start the engine and maintain it in operating condition.
7. A gas-dynamic engine as defined in claim 6 wherein said isolation means comprises first and second means impervious to gas flow when closed and independently operable.
8. A gas-dynamic engine as defined in claim 6 wherein said conveying means including a sonic section through which the gas moves, said isolation means comprises first and second barrier means independently operable between fully open and fully closed positions, and one of said barrier means being arranged upstream of the sonic section with the other barrier means being arranged downstream of the sonic section.
9. A gas-dynamic engine as defined in claim 8 including means for operating the first and second barrier means in a timed relationship.
10. A gas-dynamic engine as defined in claim 9 wherein said barrier means are constructed and defined to be substantially impervious to gas flow when closed and shaped to conform with a predetermined geometry of gas flow when open and capable of very rapid operation from the closed to the open positions.

References Cited
UNITED STATES PATENTS

| | | | |
|---|---|---|---|
| 3,404,516 | 6/1962 | Brees | 60—270X |
| 3,109,285 | 11/1963 | Smith | 60—59TX |
| 3,203,167 | 8/1965 | Green | 60—59TX |
| 3,358,909 | 12/1967 | Mansson | 60—39.14X |

EDGAR W. GEOGHEGAN, Primary Examiner

U.S. Cl. X.R.

60—39.14, 39.53, 270